May 20, 1941.　　　　W. STEIN　　　　2,242,765
COUPLING
Filed April 15, 1939　　　2 Sheets-Sheet 1

Inventor:
WOLFGANG STEIN
By: Richards & Geier
Attorneys

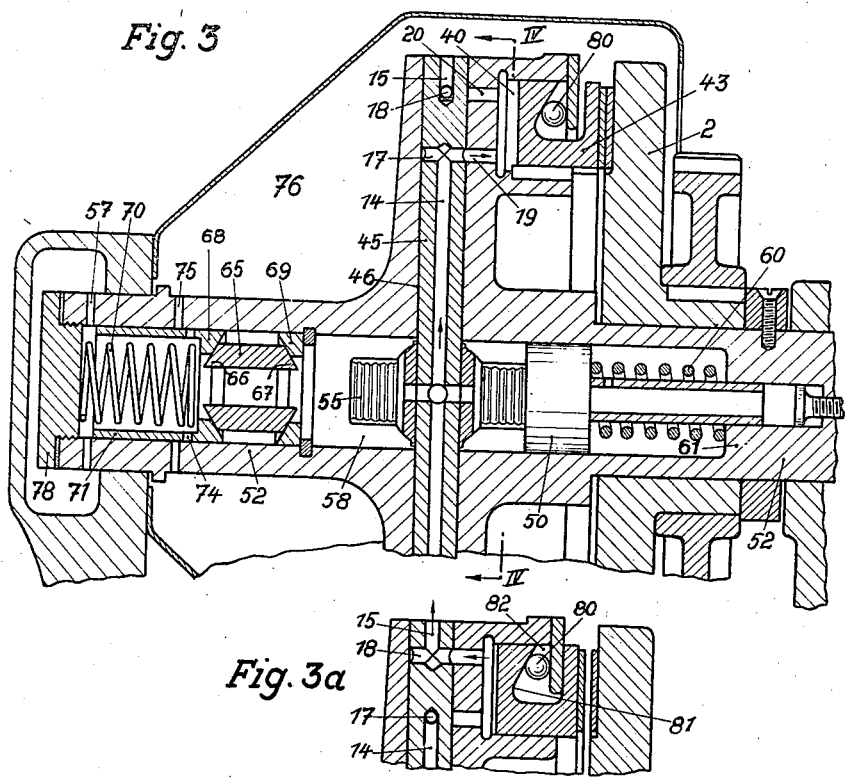
Fig. 3
Fig. 3a
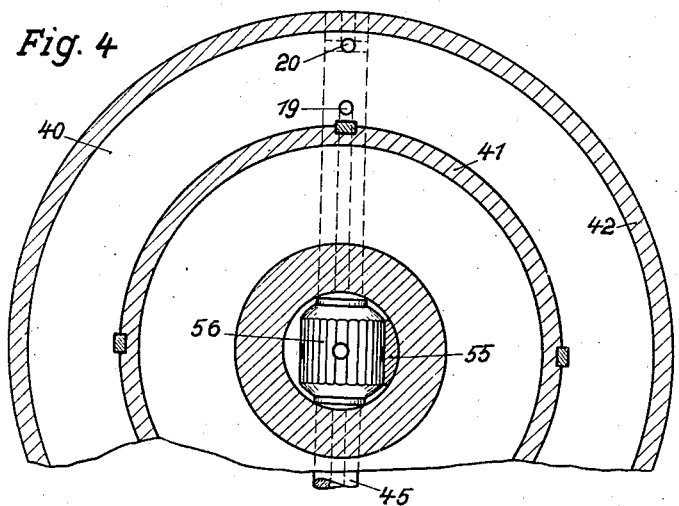
Fig. 4
Inventor:
WOLFGANG STEIN
By:
Richards & Geier
Attorneys Patented May 20, 1941

2,242,765

UNITED STATES PATENT OFFICE 2,242,765

COUPLING

Wolfgang Stein, Dessau, Germany, assignor to Junkers Flugzeug-und-Motorenwerke A. G., Dessau, Germany, a corporation of Germany Application April 15, 1939, Serial No. 268,068
In Germany April 16, 1938

11 Claims. (Cl. 192—85)

This invention relates to a frictional coupling and refers more particularly to a coupling having frictional engaging surfaces carried by a driving element and a driven element, said surfaces being engaged or disengaged by an operator by means of a piston operated by a pressure-transmitting liquid.

An object of the present invention is the provision of a liquid-actuated frictional coupling which is so constructed that it may be actuated at high speeds with the same ease, accuracy and precision as when it rotates with a small number of revolutions.

Other objects of the present invention will be apparent in the course of the following specification.

The objects of the present invention may be realized by supplying in such manner the pressure-transmitting liquid to the piston chamber situated at a distance from the axis of rotation of the coupling that the liquid is subjected to centrifugal forces on its way to the chamber and thus its pressure is additionally increased. The removal of the liquid from the chamber also takes place outwardly in the direction of the centrifugal forces.

The liquid is supplied to the cylinder by means of a passage the inflow end of which is situated close to the main axis of the coupling, and which extends outwardly to the piston chamber.

Preferably, the chamber containing the piston is constructed as an annular chamber the axis of which coincides with the axis of rotation of the coupling, said chamber being provided with substantially cylindrical end surfaces, while the piston has the form of a ring which is movable within this annular chamber in the axial direction.

The flow of the liquid to and from the piston chamber is regulated by a separate regu'ting element containing a passage which may communicate with the source of the liquid and with the liquid outflow, said passage being so constructed that in certain positions of the regulating element the source of the liquid under pressure is in communication with the piston chamber while in other positions the liquid outflow communicates with the piston chamber.

The regulating element may be actuated either manually or automatically, depending upon the amount of pressure of the inflowing liquid.

Preferably, the regulating element operated manually or by the pressure of the liquid, has the form of a rotary valve which extends radially and which is situated within that portion of the coupling which contains the piston chamber. That part of the regulating element which is situated adjacent the axis of rotation of the coupling is provided with teeth meshing with the teeth of another body connected with an actuating element.

In the couplings in which the actuating element is moved depending upon the pressure of the liquid, this element has the form of a piston, one side of which is subjected to the pressure of the liquid, while its other side is engaged by a spring.

The coupling constructed in accordance with the present invention, preferably, also comprises means which automatically disengage the coupling when the speed of revolution of the coupling becomes too high, as well as means which move the piston of the coupling back to its inoperative position after the coupling has been disengaged.

The invention will appear more clearly from the following detailed description when taken in connection with the accompanying drawings showing, by way of example, preferred embodiments of the inventive idea.

Similar parts are designated by the same reference numerals throughout the drawings.

In the drawings:

Figure 3 is a longitudinal central section through a different coupling having an actuating element which is operated by the pressure-transmitting liquid, the coupling being shown in its operative position;

Figure 3a shows a part of the coupling illustrated in Figure 3 in its inoperative position; and Figure 4 is a section along the line IV—IV of Figure 3.

Figure 1:
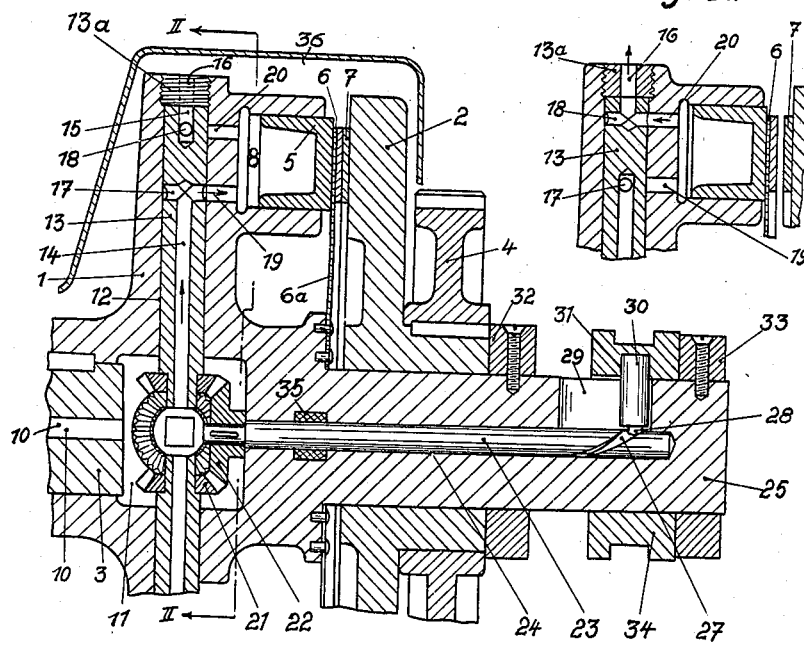
Figure 1 is a longitudinal central section through a hydraulic frictional coupling constructed in accordance with the principles of the present invention and provided with an actuating element which is operated by hand, the coupling being shown in its engaged position.
Figure 1A:
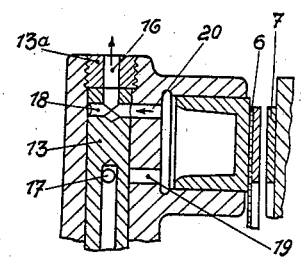
Figure 1a illustrates a portion of the coupling shown in Figure 1 in the disengaged position of the coupling.
Figure 2:
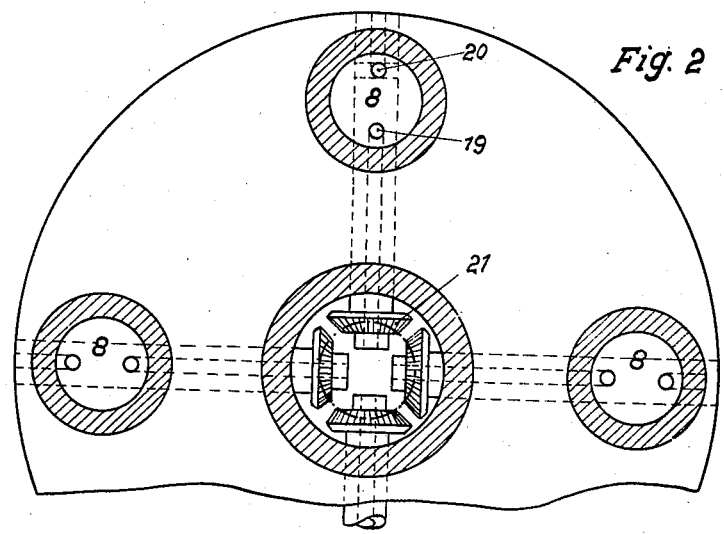
Figure 2 is a section along the line II—II of Figure 1.

The coupling shown in Figures 1, 1a, and 2 of the drawings comprises two main bodies 1 and 2 (Fig. 1), the body 1 being keyed upon the driving shaft 3, while the body 2 is firmly connected with the driven shaft, which is not shown in the drawings, through the medium of a toothed crown 4 keyed upon a sleeve which constitutes a part of the body 2.

As indicated in Figures 1 and 1a, the purpose of the coupling is to interconnect and disengage the members 1 and 2 through the medium of opposed frictional surfaces 6 and 7.

As shown in Figure 2, the body 1 is provided with a plurality of cylindrical chambers 8 which are situated at equal angular distances from each other and the axes of which extend parallel to the axis of rotation of the coupling, which coincides with the central axis of the shaft 3.

Each of the chambers 8 contains a separate cup-shaped piston 5, which is movable within its chamber and the bottom of which is directed toward the coupling body 2. Each of the pistons 5 is fitted to the walls of its chamber 8, so that it constitutes a liquid-tight closure.

A resilient disc 6a is firmly attached by bolts or rivets to the coupling body 1 and carries the frictional surfaces 6 which are situated close to the pistons 5.

As shown in Figures 1 and 1a, a movement of the pistons 5 toward the body 2 will press the frictional surfaces 6 against the frictional surfaces 7 which are firmly connected with the coupling body 2 and which are situated opposite the frictional surfaces 6.

The pistons 5 are moved toward the coupling body 2 by a liquid which is supplied under pressure to the piston chambers 8 from a source which is not shown in the drawings and which, for example, may constitute the lubricating circuit of a power engine. This source is connected with one end of a passage 10 formed in the driving shaft 3, the other end of the passage being in communication with a chamber 11 formed in the coupling body 1.

The coupling body 1 is also provided with a plurality of passages 12 extending radially from the chamber 11 and closed at their outer ends in a liquid-tight manner by the bolts 13a. The radial passages 12 contain the regulating elements 13 having the form of cylindrical rotary valves which are provided with inflow passages 14 and outflow passages 15 which do not communicate with the passages 14.

The passages 14 used for supplying the liquid to the piston chambers 8 are in communication with the inner chamber 11. The passages 15 used for the withdrawal of the liquid are in communication with passages 16 provided in the bolts 13a and leading to the exterior of the coupling.

Transverse channels or passages 17 and 18 are also provided in the valves 13 and are in communication with the passages 14 and 15, respectively.

In the operative position of the coupling shown in Figure 1, the passages 17 are also in communication with the passages 19, which are formed in the body 1 and which lead to the piston chambers 8; the transverse passages 18 are closed.

In the disengaged position of the coupling, shown in Figure 1a, the passages 17 are devoid of communication with the passages 19, while the passages 18 connect the passages 16 with passages 20, which also lead to the piston chambers 8 and are provided in the body 1.

Each of the valves 13 has an inner end situated within the chamber 11 and carrying a conical gear wheel 21, which co-operates with the conical gear wheel 22. The gear wheel 22 is keyed upon a shaft 23 which is rotatably mounted within a passage 24 provided in a cylindrical sleeve 25 constituting an integral part of the coupling body 1. However, the shaft 23 while being rotatable cannot be shifted in the direction of its axis.

The outer end of the shaft 23 is provided with a substantially steep helical groove 27 containing a pin-shaped end 28 of a bar 30 which is reciprocable within a slot 29 of the sleeve 25. The outer end of the bar 30 is held in the cavity 31 of a sleeve 34 which encloses the sleeve 25 and may be shifted axially thereon between two immovable sleeves 32 and 33 which are firmly connected by bolts with the sleeve 25. The shaft 24 is enclosed by packings 35 in order to prevent the penetration of liquid from the inner chamber 11 to the slot 29.

The operation of the coupling is as follows:

When the rotary valves 13 are in the position shown in Figure 1, the inflow channels 14 of the valves 13 are connected with the piston chambers 8 by means of the passages 17 and 19. Then the pressure-transmitting liquid which reaches the chamber 11 through the passage 10 in the shaft 3, flows through the passages 14, 17, and 19 into the piston chambers 8 and presses the pistons 5 outwardly toward the coupling body 2. The pistons 5 press the frictional surfaces 6 of the disc 6a against the frictional surfaces 7 which are in engagement with the coupling body 2. Thus the coupling body 2 is frictionally connected with the coupling body 1 and the two bodies 1 and 2 rotate jointly. Due to the rotation of the coupling body 1, considerable centrifugal forces are exerted upon the liquid flowing in the passages 14, with the result that the operative pressure in the piston chambers 8 is considerably increased, thus increasing the pressure transmitted by the pistons 5 to the frictional surfaces 6 and 7. The result is that a particularly firm and effective connection of the coupling bodies 1 and 2 is attained.

If the ring 34, movably mounted upon the sleeve 25, is shifted to the left (looking in the direction of Fig. 1), i. e. toward the ring 32 which is firmly connected with the sleeve 25, then the pin 28 of the bar 30, which is carried by the ring 34, is moved within the helical groove 27 provided in the shaft 23, thereby causing a rotation of the shaft 23. This rotation is transmitted by the conical gears 22 and 21 to the valves 13, which are turned to the position shown in Figure 1a. In this position the connection between the passages 14 and the piston chambers 8 is interrupted, while the outflow passages 15, which are connected with the passages 16 of the bolts 13a, are also connected by the passages 18 with the passages 20 communicating with the piston chambers 8. Thus the liquid flows outwardly from the chambers 8 through the passages 20, 18, 15, and 16, so that the pressure exerted upon the pistons 5 drops and the frictional connection between the coupling bodies 1 and 2 is interrupted.

A container 36 is used to collect the liquid flowing out of the passages 16, said container being preferably connected with an outflow conduit which is not shown in the drawings.

The coupling illustrated in Figures 3, 3a, and 4 of the drawings comprises a coupling body which is connected with a driving shaft not shown in the drawings, and a second coupling body 2 which is connected with a driven shaft (not shown). The coupling bodies are brought into engagement with each other by means of frictional surfaces which are actuated by an annular piston 43.

The piston chamber 40 has the form of a ring which is coaxial with the axis of rotation of the coupling and is limited by the cylindrical walls or ribs 41 and 42. The annular piston 43 is reciprocable within the annular chamber 40 between the walls 41 and 42 in the directions of the axis of the coupling.

A rotary valve 45 is used to transmit the liquid under pressure to the piston chamber 40. The valve 45 is situated within the passage 46 formed in the coupling body and extending diametrically therethrough. The valve 45 is rotatable within the passage 46 but cannot be moved axially; it is so constructed that the centrifugal forces exerted upon it in the course of the rotation of the coupling are balanced.

As in the previously described construction, the valve 45 is provided with passages 14 serving for the supply of the liquid under pressure, as well as passages 15 through which the liquid is removed. Transverse passages 17 may connect the passages 14 with passages 19 leading to the piston chamber 40, while transverse passages 18 are adapted to connect the outflow passages 15 with passages 20 also leading to the piston chamber 40.

The connection of the passages 17 with the passages 19 and of the passages 18 with the passages 20 is established by turning the valve 45.

The valve 45 is turned through the medium of a piston 50 situated within an inner chamber 58 which extends in the direction of the axis of rotation of the coupling and which is provided in a cylindrical sleeve 52 constituting a part of the coupling body or firmly connected therewith. The movement of the piston 50 is transmitted to the valve 45 by a toothed rack 55, which is firmly connected with the piston 50 and is movable therewith. The teeth of the rack 55 mesh with the teeth of a toothed segment 56 which is mounted upon the valve 45 and is firmly connected therewith. The segment 56 is provided with passages enabling the liquid filling the chamber 58 to reach the passages 14.

The liquid under pressure is supplied to the chamber 58 through the inflow passages 57 provided in the sleeve 52, and fills that part of the chamber 58 which is situated in front of the piston 50.

The rear side of the piston 50 is in engagement with one end of a coiled spring 60 the pressure of which is opposed to the pressure of the liquid supplied to the chamber 58. The opposite end of the spring 60 presses against a support 61 constituting a part of the sleeve 52.

This coupling is operated as follows:

Liquid under pressure is supplied through the passages 57 into the chamber 58 and presses against the piston 50 tending to compress the spring 60. Since the piston 50 is firmly connected with the rack 55 which actuates the rotary valve 45, the position of the valve 45 depends upon the amount of pressure exerted by the liquid.

When the pressure exerted upon the piston 50 by the liquid has reached a predetermined amount, the piston 50 and the rack 55 connected therewith turn the valve 45 to the position shown in Figure 3 in which the liquid which has penetrated the passages 14 through openings provided in the valve 45 and the member 56, can flow through the passages 17 and 19 into the piston chamber 40, pressing against the annular piston 43 and shifting it toward the coupling body 2 until the frictional surfaces situated between the piston 43 and the coupling body 2 are firmly pressed against each other.

The coupling is disconnected automatically as well, namely, as soon as the pressure of the liquid in the passages 57 and in the chamber 58 is diminished, the spring 60 presses the piston 50 in a direction toward the valve body 45. Since the rack 55 moves along with the piston 50 it will turn the valve body 45 until it assumes the position shown in Figure 3a. In this position, the connection of the passages 14 with the passages 19 through the passages 17 is interrupted, while the passages 18 connect the piston chamber 40 with the outflow passages 15 by means of the passages 20. Then the liquid situated within the piston chamber 40 will flow out of the coupling through the passages 20, 18 and 15, the flow of the liquid being facilitated by the centrifugal forces.

The effect of the centrifugal forces upon the removal of the liquid is particularly advantageous, since residues, such as mud or the like, are removed along with the liquid.

In a coupling of the described type, it is often desirable that the coupling be automatically disconnected when the number of revolutions of the driving shaft is increased beyond a certain amount, in order to prevent undue stress upon the driven elements. The device used for this purpose comprises a plurality of bodies 65 actuated by centrifugal forces and having the form of wedges situated within the chamber 58 of the sleeve 52. Inclined surfaces of the members 65 are in contact with the inclined surfaces of supports 68 and 69. The support 69 is firmly connected to the supporting sleeve 52 and is immovable relatively thereto. The support 68, on the other hand, may be shifted axially within the chamber 58.

A spring 70 is in engagement with the support 68 and tends to press it in a direction toward the support 69. The opposite end of the spring 70 is in engagement with an adjustable bolt 78 screwed into one end of the sleeve 52. By turning the bolt 78, the force with which the spring 70 presses against the support 68 may be adjusted at will.

The action of the spring 70 is substantially opposed to the pressure of the members 65 resulting from the centrifugal forces.

The sleeve 71, which is integral with the support 68, is slidable upon the inner cylindrical walls of the chamber 58 and is in liquid-tight engagement with these walls.

When the number of revolutions of the driving shaft has been increased beyond a certain predetermined amount, the increased centrifugal forces press the members 65 outwardly away from each other and this pressure is transmitted to the support 68 and the sleeve 71, with the result that the sleeve 71 along with the support 68 is moved toward the bolt 78, thereby compressing the spring 70. The outer edges of the sleeve 71 thus move over the passages 57 and close these passages, so that the inflowing liquid cannot reach the chamber 58 any more.

The sleeve 71 is also provided with openings 74 which coincide with the passages 75 provided in the sleeve 52 in the described closed position of the sleeve 71. The passages 75 communicate with the chamber 76, which is free of pressure and which is connected to a conduit for the outflowing liquid (not shown).

Therefore, in the closed position of the sleeve 71, the liquid situated in the chamber 58 and in the passages 14 flows through the openings 74 and the passages 75 into the chamber 76. Consequently, the pressure of the liquid upon the piston 50 is considerably diminished and the spring 60 is enabled to move the piston 50 and close the valve 45, thus disconnecting the coupling.

The described coupling is also provided with a device through the use of which the separation of the frictional surfaces may be easily and securely achieved. By means of this device, the annular piston 43 is moved back into its original position as soon as the pressure in the piston chamber 40 is diminished.

The device comprises a plurality of balls or similar bodies 80 which are actuated by the centrifugal forces and which are situated between an annular inclined surface 81 of the piston 43 on the one hand and a surface 82 of an annular flange constituting a part of the coupling body, on the other hand.

The centrifugal forces acting upon the bodies 80 cause them to press the surfaces 81 and 82 away from each other, with the result that the annular piston 43 is moved back to its original position, shown in Figure 3a, as soon as the pressure of the liquid in the chamber 40 upon the piston 43 is diminished.

It is apparent that the specific illustrations shown above have been given by way of illustration and not by way of limitation, and that the structures above described are subject to wide variation and modification without departing from the scope or intent of the invention, all of which variations and modifications are to be included within the scope of the present invention.

What is claimed is:

1. A frictional coupling, comprising a rotary driving body, a rotary driven body, means connected with said bodies and having frictional surfaces adapted to engage each other to frictionally interconnect said bodies, one of said bodies having a chamber formed therein, a piston reciprocable within said chamber and engaging said means to bring said frictional surfaces into engagement with each other and to interrupt this engagement, a radially extending rotary valve carried by the last-mentioned body and having a passage formed therein for transmitting an operating liquid toward said chamber, another passage formed therein for transmitting said liquid from said chamber, said passages extending in the direction of said valve, said liquid actuating said piston in said chamber, the first-mentioned passage communicating with the source of said operating liquid, said valve having other passages formed therein connecting either one of the two first-mentioned passages with said chamber in a predetermined position of said valve, and means connected with said valve for turning the same.

2. A frictional coupling, comprising a rotary driving body, a rotary driven body, means connected with said bodies and having frictional surfaces adapted to engage each other to frictionally interconnect said bodies, one of said bodies having a chamber formed therein, a piston reciprocable within said chamber and engaging said means to bring said frictional surfaces into engagement with each other and to interrupt this engagement, a regulating element carried by the last-mentioned body and having a passage formed therein for transmitting an operating liquid toward said chamber, another passage formed therein for transmitting said liquid from said chamber, said liquid flowing in the direction of centrifugal forces and actuating said piston in said chamber, the first-mentioned passage communicating with the source of said operating liquid, said regulating element having other passages formed therein connecting either one of the two first-mentioned passages with said chamber in a predetermined position of said regulating element, and means removed from said regulating element and actuated by the pressure of said liquid flowing from said source to the first-mentioned passage, the last-mentioned means being mechanically connected with said regulating element to vary the position thereof.

3. A frictional coupling, comprising a rotary driving body, a rotary driven body, means connected with said bodies and having frictional surfaces adapted to engage each other to frictionally interconnect said bodies, one of said bodies having a chamber formed therein, a piston reciprocable within said chamber and engaging said means to bring said frictional surfaces into engagement with each other and to interrupt this engagement, a radially extending rotary valve carried by the last-mentioned body and having a passage formed therein for transmitting an operating liquid toward said chamber, another passage formed therein for transmitting said liquid from said chamber, said passages extending in the direction of said valve, said liquid actuating said piston in said chamber, the first-mentioned passage communicating with the source of said operating liquid, said valve having other passages formed therein connecting either one of the two first-mentioned passages with said chamber in a predetermined position of said valve, a toothed member connected with that end of the radially extending valve which is closest to the axis of rotation of the last-mentioned body, another member having teeth meshing with the teeth of the first-mentioned member, and means connected with the second-mentioned member for turning said valve, the last-mentioned means having a surface which is adapted to be in contact with said liquid.

4. A frictional coupling, comprising a rotary driving body, a rotary driven body, means connected with said bodies and having frictional surfaces adapted to engage each other to frictionally interconnect said bodies, one of said bodies having a chamber formed therein, a piston reciprocable within said chamber and engaging said means to bring said frictional surfaces into engagement with each other and to interrupt this engagement, a radially extending rotary valve carried by the last-mentioned body and having a passage formed therein for transmitting an operating liquid toward said chamber, another passage formed therein for transmitting said liquid from said chamber, said passages extending in the direction of said valve, said liquid actuating said piston in said chamber, the first-mentioned passage communicating with the source of said operating liquid, said valve having other passages formed therein connecting either one of the two first-mentioned passages with said chamber in a predetermined position of said valve, a toothed member connected with that end of the radially extending valve which is closest to the axis of rotation of the last-mentioned body, another member having teeth meshing with the teeth of the first-mentioned member, a piston connected with the second-mentioned member and having a surface which is adapted to be in contact with said liquid, and a spring engaging the opposite surface of the last-mentioned piston.

5. A frictional coupling, comprising a rotary driving body, a rotary driven body, means connected with said bodies and having frictional surfaces adapted to engage each other to frictionally interconnect said bodies, one of said bodies having a chamber formed therein, a piston reciprocable within said chamber and engaging said means to bring said frictional surfaces into engagement with each other and to interrupt this engagement, a radially extending rotary valve carried by the last-mentioned body and having a passage formed therein for transmitting an operating liquid toward said chamber, another passage formed therein for transmitting said liquid from said chamber, said passages extending in the direction of said valve, said liquid actuating said piston in said chamber, said valve having other passages formed therein connecting either one of the two first-mentioned passages with said chamber in a predetermined position of said valve, a toothed member connected with that end of the radially extending valve which is closest to the axis of rotation of the last-mentioned body, another member having teeth meshing with the teeth of the first-mentioned member, the last-mentioned body having another chamber formed therein, the last-mentioned chamber being cylindrical and having a central axis coinciding with the axis of rotation of the last-mentioned body, the last-mentioned chamber communicating with the first-mentioned passage and a source of said operating liquid, a piston situated within the last-mentioned chamber and connected with the second-mentioned member, and a spring pressing against the last-mentioned piston in a direction opposed to the pressure of said operating liquid.

6. A frictional coupling, comprising a rotary driving body, a rotary driven body, means connected with said bodies and having frictional surfaces adapted to engage each other to frictionally interconnect said bodies, one of said bodies having a chamber formed therein, a piston reciprocable within said chamber and engaging said means to bring said frictional surfaces into engagement with each other and to interrupt this engagement, a radially extending rotary valve carried by the last-mentioned body and being disposed therein to balance the centrifugal forces exerted upon the valve in the course of rotation of the last-mentioned body, said valve having a passage formed therein for transmitting an operating liquid toward said chamber, another passage formed therein for transmitting said liquid from said chamber, said passages extending in the direction of said valve, said liquid actuating said piston in said chamber, the first-mentioned passage communicating with the source of said operating liquid, said valve having other passages formed therein connecting either one of the two first-mentioned passages with said chamber in a predetermined position of said valve, and means connected with said valve for actuating the same.

7. A frictional coupling, comprising a rotary driving body, a rotary driven body, means connected with said bodies and having frictional surfaces adapted to engage each other to frictionally interconnect said bodies, one of said bodies having a chamber formed therein, a piston reciprocable within said chamber and engaging said means to bring said frictional surfaces into engagement with each other and to interrupt this engagement, a regulating element carried by the last-mentioned body and having a passage formed therein for transmitting an operating liquid toward said chamber, another passage formed therein for transmitting said liquid from said chamber, said liquid flowing in the direction of centrifugal forces and actuating said piston in said chamber, the first-mentioned passage communicating with the source of said operating liquid, said regulating element having other passages formed therein connecting either one of the two first-mentioned passages with said chamber in a predetermined position of said regulating element, means connected with said regulating element to vary the position thereof, a centrifugal regulator comprising a closure member for interrupting the flow of the liquid from said source to the first-mentioned passage, and a spring engaging said centrifugal regulator and causing said closure member to interrupt this flow when the speed of rotation of said bodies exceeds a predetermined amount.

8. A frictional coupling, comprising a rotary driving body, a rotary driven body, means connected with said bodies and having frictional surfaces adapted to engage each other to frictionally interconnect said bodies, one of said bodies having a chamber formed therein, a piston reciprocable within said chamber and engaging said means to bring said frictional surfaces into engagement with each other and to interrupt this engagement, a regulating element carried by the last-mentioned body and having a passage formed therein for transmitting an operating liquid toward said chamber, another passage formed therein for transmitting said liquid from said chamber, said liquid flowing in the direction of centrifugal forces and actuating said piston in said chamber, the first-mentioned passage communicating with the source of said operating liquid, said regulating element having other passages formed therein connecting either one of the two first-mentioned passages with said chamber in a predetermined position of said regulating element, means connected with said regulating element to vary the position thereof, means causing a disengagement of the coupling when the speed of rotation of said bodies exceeds a predetermined amount, and adjusting means connected with the last-mentioned means to adjust the amount of speed of rotation at which the disengagement of the coupling takes place.

9. A frictional coupling, comprising a rotary driving body, a rotary driven body, means connected with said bodies and having frictional surfaces adapted to engage each other to frictionally interconnect said bodies, one of said bodies having a chamber formed therein, a piston reciprocable within said chamber and engaging said means to bring said frictional surfaces into engagement with each other and to interrupt this engagement, a regulating element carried by the last-mentioned body and having a passage formed therein for transmitting an operating liquid toward said chamber, another passage formed therein for transmitting said liquid from said chamber, said liquid flowing in the direction of centrifugal forces and actuating said piston in said chamber, the first-mentioned passage communicating with the source of said operating liquid, said regulating element having other passages formed therein connecting either one of the two first-mentioned passages with said chamber in a predetermined position of said regulating element, means connected with said regulating element to vary the position thereof, and means interrupting the flow of the liquid from said source to the first-mentioned passage and simultaneously providing an outflow of the liquid from the first-mentioned passage to cause a disengagement of the coupling when the speed of rotation of said bodies exceeds a predetermined amount.

10. A frictional coupling, comprising a rotary driving body, a rotary driven body, means connected with said bodies and having frictional surfaces adapted to engage each other to frictionally interconnect said bodies, one of said bodies having a chamber formed therein, a piston reciprocable within said chamber and engaging said means to bring said frictional surfaces into engagement with each other and to interrupt this engagement, a regulating element carried by the last-mentioned body and having a passage formed therein for transmitting an operating liquid toward said chamber, another passage formed therein for transmitting said liquid from said chamber, said liquid flowing in the direction of centrifugal forces and actuating said piston in said chamber, the first-mentioned passage communicating with the source of said operating liquid, said regulating element having other passages formed therein connecting either one of the two first-mentioned passages with said chamber in a predetermined position of said regulating element, means connected with said regulating element to vary the position thereof, and means actuated by centrifugal forces and engaging said piston for moving said piston to an inoperative position to interrupt the engagement of said frictional surfaces when the pressure of the liquid in said chamber is diminished.

11. A frictional coupling, comprising a rotary driving body, a rotary driven body, means connected with said bodies and having frictional surfaces adapted to engage each other to frictionally interconnect said bodies, one of said bodies having a chamber formed therein, a piston reciprocable within said chamber and engaging said means to bring said frictional surfaces into engagement with each other and to interrupt this engagement, a regulating element carried by the last-mentioned body and having a passage formed therein for transmitting an operating liquid toward said chamber, another passage formed therein for transmitting said liquid from said chamber, said liquid flowing in the direction of centrifugal forces and actuating said piston in said chamber, the first-mentioned passage communicating with the source of said operating liquid, said regulating element having other passages formed therein connecting either one of the two first-mentioned passages with said chamber in a predetermined position of said regulating element, means connected with said regulating element to vary the position thereof, said piston having an inclined surface, the last-mentioned body having a surface adjacent said inclined surface of the piston, and members actuated by centrifugal forces and contacting the two last-mentioned surfaces to move said piston to an inoperative position and thereby disengage the coupling when the pressure of the liquid in said chamber is diminished.

WOLFGANG STEIN.